United States Patent
Boyd et al.

(10) Patent No.: US 7,937,518 B2
(45) Date of Patent: May 3, 2011

(54) METHOD, APPARATUS, AND COMPUTER USABLE PROGRAM CODE FOR MIGRATING VIRTUAL ADAPTERS FROM SOURCE PHYSICAL ADAPTERS TO DESTINATION PHYSICAL ADAPTERS

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/342,050

(22) Filed: Dec. 22, 2008

(65) Prior Publication Data

US 2009/0100204 A1 Apr. 16, 2009

Related U.S. Application Data

(63) Continuation of application No. 11/351,020, filed on Feb. 9, 2006, now Pat. No. 7,484,029.

(51) Int. Cl.
*G06F 13/36* (2006.01)
(52) U.S. Cl. .............................. 710/310; 711/1; 709/226
(58) Field of Classification Search .................. 711/1, 6; 710/1, 62, 311–312, 316, 310; 709/226, 709/250, 238
See application file for complete search history.

(56) References Cited

U.S. PATENT DOCUMENTS

| | | | |
|---|---|---|---|
| 5,257,353 | A | 10/1993 | Blanck et al. |
| 5,367,695 | A | 11/1994 | Narad et al. |
| 5,392,328 | A | 2/1995 | Schmidt et al. |
| 5,960,213 | A | 9/1999 | Wilson |
| 5,968,189 | A | 10/1999 | Desnoyers et al. |
| 6,061,753 | A | 5/2000 | Ericson |
| 6,662,251 | B2 | 12/2003 | Brock et al. |
| 6,769,021 | B1 | 7/2004 | Bradley |
| 6,775,750 | B2 | 8/2004 | Krueger |

(Continued)

FOREIGN PATENT DOCUMENTS

WO 2006089914 A1 8/2006

OTHER PUBLICATIONS

USPTO notice of allowance for U.S. Appl. No. 12/355,931 dated Aug. 23, 2010.

(Continued)

*Primary Examiner* — Clifford H Knoll
(74) *Attorney, Agent, or Firm* — Yee & Associates, P.C.; Libby Z. Toub

(57) ABSTRACT

A computer-implemented method, apparatus, and computer usable program code are disclosed for migrating a virtual adapter from a source physical adapter to a destination physical adapter in a data processing system where multiple host computer systems share multiple adapters and communicate with those adapters through a PCI switched-fabric bus. The virtual adapter is first caused to stop processing transactions. All in-flight transactions that are associated with the virtual adapter are then captured. The configuration information that defines the virtual adapter is moved from the source physical adapter to the destination physical adapter. The in-flight transactions are then restored to their original locations on the destination virtual adapter. The virtual adapter is then restarted on the destination physical adapter such that the virtual adapter begins processing transactions.

11 Claims, 8 Drawing Sheets

U.S. PATENT DOCUMENTS

| | | |
|---|---|---|
| 6,907,510 B2 | 6/2005 | Bennett et al. |
| 7,036,122 B2 | 4/2006 | Bennett et al. |
| 7,096,305 B2 | 8/2006 | Moll |
| 7,134,052 B2 | 11/2006 | Bailey et al. |
| 7,174,413 B2 | 2/2007 | Pettey et al. |
| 7,188,209 B2 | 3/2007 | Pettey et al. |
| 7,194,538 B1 | 3/2007 | Rabe et al. |
| 7,209,453 B1 | 4/2007 | Yun et al. |
| 7,254,697 B2 | 8/2007 | Bishop et al. |
| 7,260,664 B2 | 8/2007 | Arndt et al. |
| 7,350,029 B2 | 3/2008 | Fluhr et al. |
| 7,360,058 B2 | 4/2008 | Flood et al. |
| 7,380,046 B2 | 5/2008 | Boyd et al. |
| 7,380,066 B2 | 5/2008 | Griswell, Jr. et al. |
| 7,395,414 B2 | 7/2008 | Le et al. |
| 7,409,589 B2 | 8/2008 | Mack et al. |
| 7,457,871 B2 | 11/2008 | Barsuk |
| 2002/0188701 A1 | 12/2002 | Brown et al. |
| 2003/0221030 A1 | 11/2003 | Pontius et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0210754 A1 | 10/2004 | Barron et al. |
| 2004/0230709 A1 | 11/2004 | Moll |
| 2004/0230735 A1 | 11/2004 | Moll |
| 2005/0025119 A1 | 2/2005 | Pettey et al. |
| 2005/0044301 A1 | 2/2005 | Vasilevsky et al. |
| 2005/0102682 A1 | 5/2005 | Shah et al. |
| 2005/0120160 A1 | 6/2005 | Plouffe et al. |
| 2005/0147117 A1 | 7/2005 | Pettey et al. |
| 2005/0188116 A1 | 8/2005 | Brown et al. |
| 2005/0228531 A1 | 10/2005 | Genovker et al. |
| 2005/0270988 A1 | 12/2005 | DeHaemer |
| 2006/0168361 A1 | 7/2006 | Brown et al. |
| 2006/0174094 A1 | 8/2006 | Lloyd et al. |
| 2006/0179195 A1 | 8/2006 | Sharma et al. |
| 2006/0179265 A1 | 8/2006 | Flood et al. |
| 2006/0184711 A1 | 8/2006 | Pettey et al. |
| 2006/0184769 A1 | 8/2006 | Floyd et al. |
| 2006/0184770 A1 | 8/2006 | Bishop et al. |
| 2006/0184946 A1 | 8/2006 | Bishop et al. |
| 2006/0195617 A1 | 8/2006 | Arndt et al. |
| 2006/0195619 A1 | 8/2006 | Arndt et al. |
| 2006/0195634 A1 | 8/2006 | Arndt et al. |
| 2006/0195642 A1 | 8/2006 | Arndt et al. |
| 2006/0195663 A1 | 8/2006 | Arndt et al. |
| 2006/0195673 A1 | 8/2006 | Arndt et al. |
| 2006/0195848 A1 | 8/2006 | Arndt et al. |
| 2006/0206655 A1 | 9/2006 | Chappell et al. |
| 2006/0206936 A1 | 9/2006 | Liang et al. |
| 2006/0209863 A1 | 9/2006 | Arndt et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0221818 A1 | 10/2006 | Alves et al. |
| 2006/0224790 A1 | 10/2006 | Arndt et al. |
| 2006/0230181 A1 | 10/2006 | Riley |
| 2006/0230217 A1 | 10/2006 | Moll |
| 2006/0242333 A1 | 10/2006 | Johnsen et al. |
| 2006/0242352 A1 | 10/2006 | Torudbakken et al. |
| 2006/0242354 A1 | 10/2006 | Johnsen et al. |
| 2006/0253619 A1 | 11/2006 | Torudbakken et al. |
| 2006/0271718 A1 | 11/2006 | DiPlacido, Jr. et al. |
| 2007/0019637 A1 | 1/2007 | Boyd et al. |
| 2007/0027952 A1 | 2/2007 | Boyd et al. |
| 2007/0097871 A1 | 5/2007 | Boyd et al. |
| 2007/0097948 A1 | 5/2007 | Boyd et al. |
| 2007/0097949 A1 | 5/2007 | Boyd et al. |
| 2007/0097950 A1 | 5/2007 | Boyd et al. |
| 2007/0101016 A1 | 5/2007 | Boyd et al. |
| 2007/0136458 A1 | 6/2007 | Boyd et al. |
| 2007/0165596 A1 | 7/2007 | Boyd et al. |
| 2007/0174733 A1 | 7/2007 | Boyd et al. |
| 2008/0137676 A1 | 6/2008 | Boyd et al. |
| 2008/0137677 A1 | 6/2008 | Boyd et al. |
| 2008/0270853 A1 | 10/2008 | Boyd et al. |
| 2009/0119551 A1 | 5/2009 | Boyd et al. |

OTHER PUBLICATIONS

USPTO office action for U.S. Appl. No. 12/134,872 dated May 14, 2010.

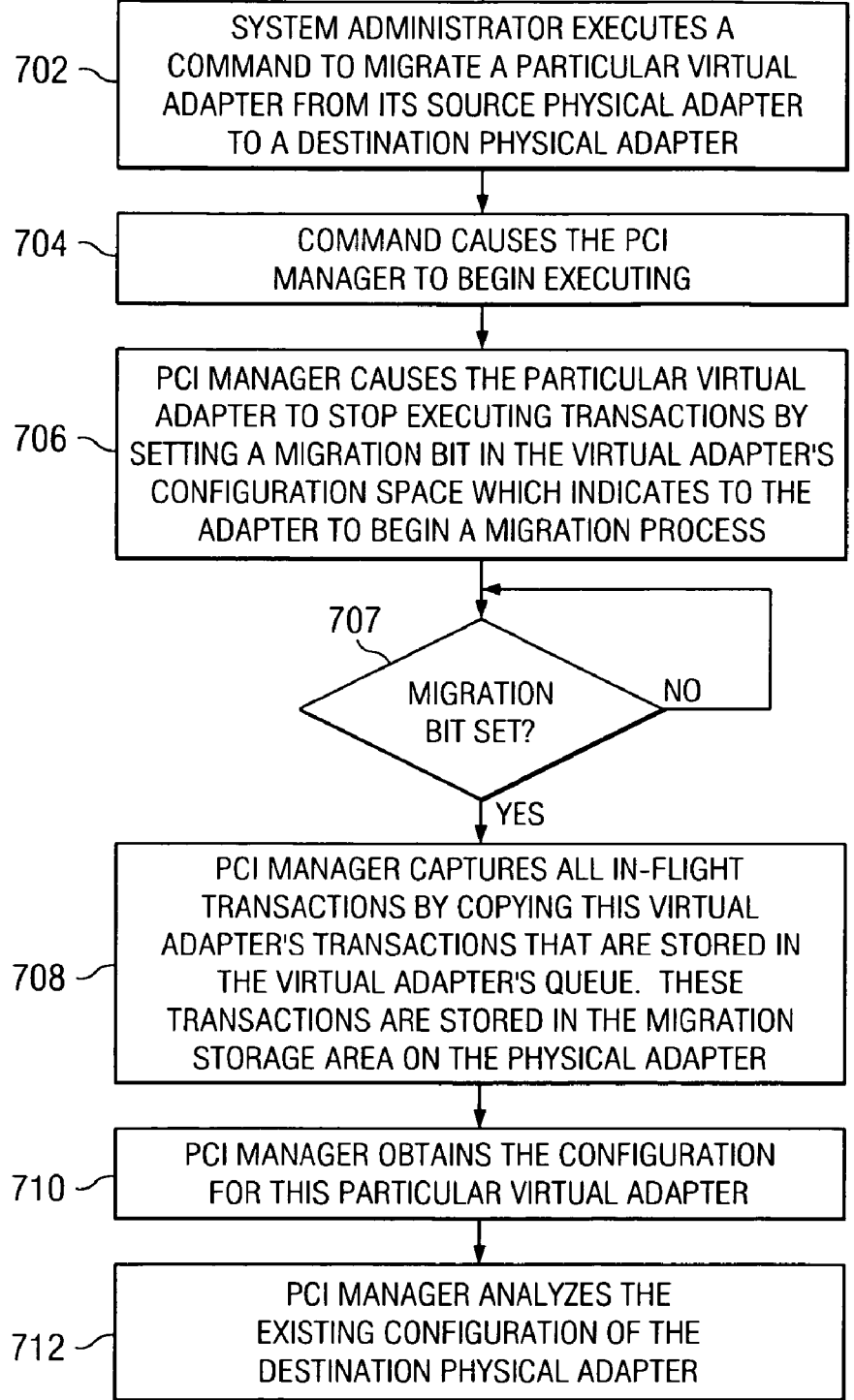

METHOD, APPARATUS, AND COMPUTER USABLE PROGRAM CODE FOR MIGRATING VIRTUAL ADAPTERS FROM SOURCE PHYSICAL ADAPTERS TO DESTINATION PHYSICAL ADAPTERS

This application is a continuation of application Ser. No. 11/351,020, filed Feb. 9, 2006, status allowed.

BACKGROUND OF THE INVENTION

1. Field of the Invention

The present invention relates generally to data processing systems and more particularly to a data processing system that includes physical adapters that have been virtualized. Still more specifically, the present invention relates to a computer-implemented method, apparatus, and computer usable program code in a data processing system where multiple host computer systems share multiple adapters and communicate with those adapters through a PCI switched-fabric bus for migrating virtual adapters from source physical adapters to destination physical adapters.

2. Description of the Related Art

A conventional PCI bus is a local parallel bus that permits expansion cards to be installed within a single computer system, such as a personal computer. PCI-compliant adapter cards can then be coupled to the PCI bus in order to add input/output (I/O) devices, such as disk drives or other devices, to the computer system. A PCI bridge/controller is needed in order to connect the PCI bus to the system bus of the computer system. The PCI bus can communicate, through the PCI bridge/controller with the CPU of the computer system in which the PCI bus is installed. Several PCI bridges may exist within a single computer system. However, these PCI bridges serve to couple multiple PCI buses to the CPU of the computer system in which the PCI buses are installed. If the single computer system includes multiple CPUs, the PCI buses can be utilized by the multiple CPUs of the single computer system.

A PCI Express (PCI-E) bus provides a migration path compatible with the PCI software environment. In addition to offering superior bandwidth, performance, and scalability in both bus width and bus frequency, PCI Express offers other advanced features. These features include QoS (quality of service), aggressive power management, native hot-plug, bandwidth per pin efficiency, error reporting, recovery and correction and innovative form factors, and meet the growing demands for sophisticated capabilities such as peer-to-peer transfers and dynamic reconfiguration. PCI Express also enables low-cost design of products via low pin counts and wires. A linearly scaled 16-lane PCI Express interconnect can provide data transfer rates of more than 8 Gigabytes per second.

The host computer system in a PCI Express computing environment typically has a PCI-to-Host bridging function commonly known as the root complex. The root complex bridges between a CPU bus such as hyper-transport and the PCI-E bus. Other functions may be performed in the root complex like address translation, if necessary. Multiple hosts containing one or more root functions are referred to as a multi-root system.

Today, PCI-E buses do not permit the sharing of PCI adapters among multiple separate computer systems. For example, a PCI adapter cannot be shared by multiple server computer systems. Thus, in existing computer systems that use a PCI bus, the physical I/O adapters cannot be shared by: a) a host operating system or guest operating system which is the sole owner of an I/O device, in the single root environment, or b) a single operating system or guest operating system which is the sole owner of an I/O device, in a multi-root environment. A single I/O device cannot be shared by multiple guest operating systems in the single root environment or by multiple guest operating systems on multiple hosts in the multi-root case.

Further, existing PCI environments do not permit the virtualization of physical I/O adapters. An I/O device cannot currently be virtualized in a standard PCI or a PCI Express data processing system. Because virtual I/O adapters cannot exist in known computer systems, known computer systems also do not permit the migration of a virtual I/O adapter from a source physical adapter to a destination physical adapter.

In known systems that do not utilize a PCI environment, a secondary physical adapter may be designated as a fail-over device for a primary physical adapter. In these systems, when the primary physical adapter fails, the secondary physical adapter is then utilized in place of the primary adapter. These systems, however, do not involve virtual adapters. In these systems, one physical device is used to replace a failed physical device. The entire primary physical adapter is replaced with the secondary physical adapter. There is no migration in these systems. There is a replacement of one device with another. Further, the replacement device, i.e. the secondary physical adapter, completely replaces the entire primary device, i.e. the primary physical adapter.

Therefore, a need exists for a computer-implemented method, apparatus, and computer usable program code for migrating virtual entities, also called virtual adapters, from source physical adapters to destination physical adapters in a data processing system where multiple host computer systems share multiple adapters and communicate with those adapters through a PCI switched-fabric bus.

SUMMARY OF THE INVENTION

A computer-implemented method, apparatus, and computer usable program code are disclosed for migrating a virtual adapter from a source physical adapter to a destination physical adapter in a data processing system where multiple host computer systems share multiple adapters and communicate with those adapters through a PCI switched-fabric bus. The virtual adapter is first caused to stop processing transactions. In this manner, the virtual adapter is taken off-line. All in-flight transactions that are associated with the virtual adapter are then captured. The configuration information that defines the virtual adapter is moved from the source physical adapter to the destination physical adapter. The in-flight transactions are then restored to their original locations. In-flight transactions that were captured from the virtual adapter when the virtual adapter was located in the source physical adapter are restored to the virtual adapter once the virtual adapter is moved to the destination physical adapter. Thus, the in-flight transactions from the virtual adapter are restored to the destination physical adapter. The virtual adapter is then restarted on the destination physical adapter such that the virtual adapter begins processing transactions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A and 7B illustrate a high level flow chart that depicts migrating a particular virtual adapter from a source physical adapter to a destination physical adapter in accordance with the illustrative embodiment of the present invention.

DETAILED DESCRIPTION OF THE PREFERRED EMBODIMENT

Figure 1:
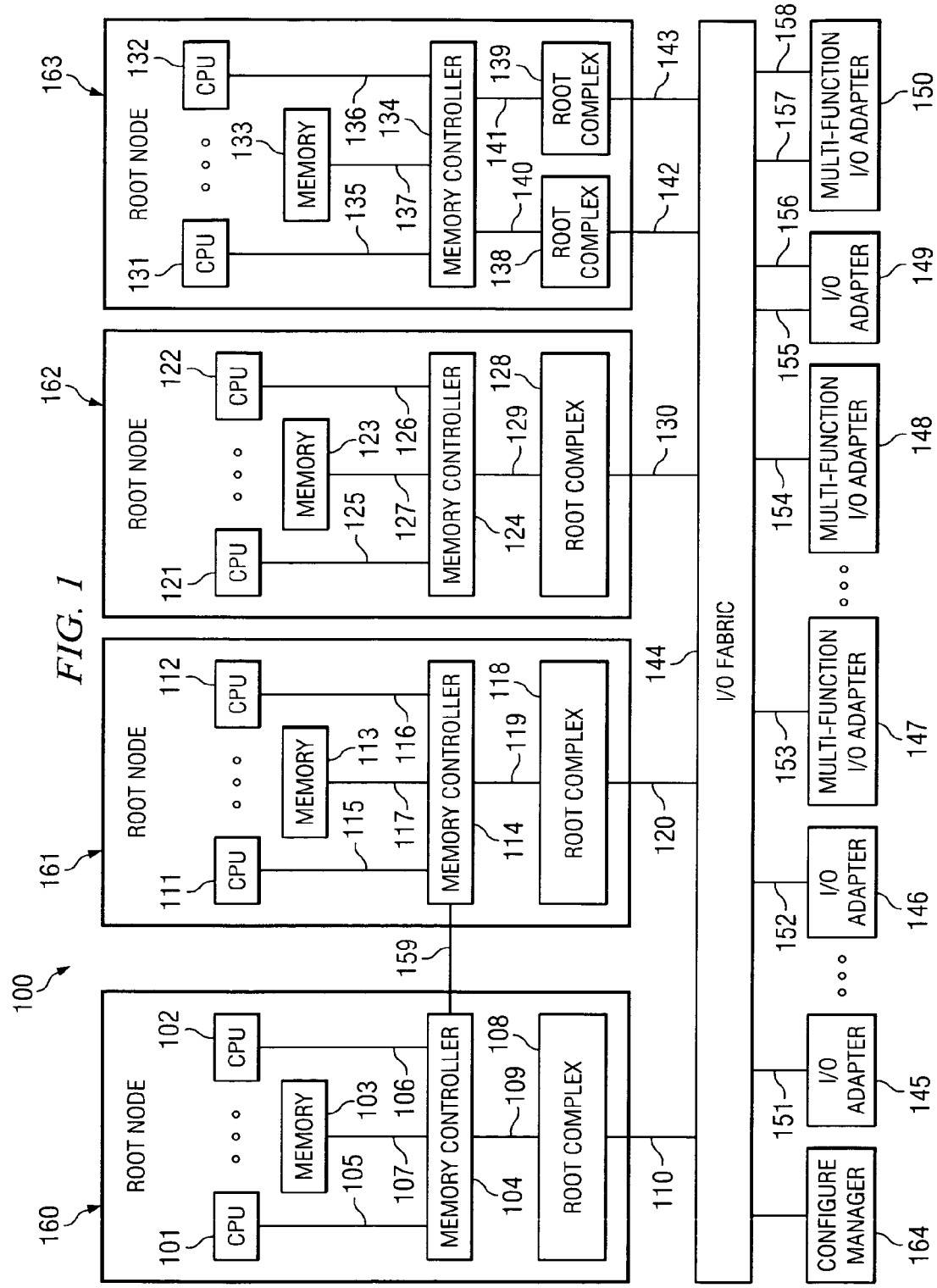
FIG. 1 is a diagram of a distributed computer system in accordance with an illustrative embodiment of the present invention.

The illustrative embodiment of the present invention applies to any general or special purpose computing system where multiple host computer systems share a pool of I/O adapters (IOAs) through a common I/O fabric. In a preferred embodiment, the fabric is a collection of devices that conform to the PCI Express standard.

In the illustrative embodiment of the present invention, the PCI Express I/O fabric is attached to more than one host computer system and to more than one I/O adapter such that the multiple different host computer systems can share the I/O adapters with other host computer systems. A physical adapter may be virtualized such that all or portions of the physical adapter are logically allocated to one or more host computer systems. Each virtual adapter appears to its host computer system as a separate and independent physical adapter. In this manner, a physical adapter that is logically divided into multiple virtual adapters can act as if it were several different and independent physical adapters.

Each virtual adapter may be assigned to the same or different host computer systems. To those skilled in the art, a virtual adapter is also known as, but not limited to a virtual entity or virtual function. For example, a particular physical adapter may be logically divided into three virtual adapters. Each one of these virtual adapters may be assigned to the same or different host computer systems.

It may be desirable to migrate a particular virtual adapter from its source physical adapter to a different physical adapter in order to improve performance, ensure high availability of adapters, clone a system, or to balance workloads among physical adapters. According to the preferred embodiment, a virtual adapter may be migrated from its source physical adapter to a destination physical adapter. The virtual adapter is defined utilizing configuration information. The configuration information for a particular virtual adapter includes all of the information that is needed to define that particular virtual adapter within a physical adapter. When the configuration information for a virtual adapter is copied to a physical adapter, the physical adapter will have everything it needs in order to include that virtual adapter within the physical adapter. When the configuration information for the virtual adapter is copied to the physical adapter, the virtual adapter is then configured within the physical adapter and is fully functional.

The source and destination hardware need to be the same version. The configuration state "save/restore" process is then just a matter of telling the adapter to "prepare to migrate", or in other words, move your state to the source device state staging area. The non-device-specific migration code then checks to see that both adapters' configuration spaces identify the same device. The code then simply copies the state from the state staging area of the source physical adapter to the destination physical adapter.

The configuration state for a virtual adapter is "containerized" and can contain anything the virtual adapter needs. The migration code does not know what it is moving, state-wise. The containerized configuration state can contain information created by the virtual adapter, such as in-flight transactions and register values on the I/O virtual adapter like on/off toggles for virtual adapter capabilities.

The illustrative embodiment brings the virtual I/O adapter to a controlled processing stop before migrating the state from the source physical adapter to the destination physical adapter. In-flight transactions, or data, in this context means transactions that are currently in the adapters' queues, fabric devices' queues, and/or host computer systems' queues. The in-flight transactions are a critical state to be migrated.

In order for a physical adapter to be virtualized to include the particular virtual adapter, the configuration information, also called configuration state, is restored in the target physical adapter. The restore process for the target virtual adapter has to restore the containerized state that has been copied to its destination device state staging area. The restore process systematically restores the state to the target virtual adapter. The PCI configuration information is then restored. The in-flight transactions are queued on the virtual adapter, fabric devices, and/or host computer systems. Adapter specific configuration such as an on/off function toggles that might enable on-adapter checksum, different network media speeds, and graphics resolution are restored in the virtual adapter.

A system administrator may choose a particular virtual adapter to be migrated from its source physical adapter to a destination physical adapter. A PCI manager, preferably, is then launched that then causes the particular virtual adapter to stop executing transactions. All of the remaining devices in the data processing system, including all remaining virtual adapters, all physical adapters, all host computer systems, and the fabric, continue processing and executing transactions. If the particular virtual adapter is included within a source physical adapter that also includes other virtual adapters, these other virtual adapters will continue processing.

The PCI manager then captures all in-flight transactions that are associated with this particular virtual adapter and stores them on the physical adapter in the migration storage area. An in-flight transaction is associated with the particular virtual adapter when the transaction was transmitted from that particular virtual adapter or was intended to be received by that particular virtual adapter. Typically, these transactions are identified when either the source or destination address in the transaction is the virtual adapter's address. If a transaction includes this particular virtual adapter as the transaction's source or destination address, the transaction is a transaction that is associated with this virtual adapter. An in-flight transaction is a transaction that is located within a queue in a device in the data processing system including a physical adapter, virtual adapter, fabric device such as a PCI bridge or switch, or a host computer system.

In-flight transactions are kept in queues that are included within each device in the data processing system. The host computer systems, virtual and physical I/O adapters, and devices within the fabric all include queues. The PCI manager captures the in-flight transactions that are associated with the particular virtual adapter by copying the transactions from the queues and storing them in storage. The storage is preferably located in the physical adapter migration storage area although it may be located anywhere in the data processing system. When these transactions are copied from the queues, they are deleted from their originating queues so that they will not be processed.

The PCI manager then obtains the configuration information for the particular virtual adapter. This configuration information may be located within the source physical adapter within which the virtual adapter is included or it may be located in storage somewhere else in the data processing system. A pointer, instead of the configuration information itself, may be included within the source physical adapter that points to the location where the configuration information is stored.

The PCI manager then analyzes the virtual adapter's configuration information and compares it to the resources that are available in the destination physical adapter. If the destination physical adapter includes sufficient available resources to support the particular virtual adapter, the particular virtual adapter may be migrated by adding the particular virtual adapter's configuration to the destination physical adapter's configuration. The containerized data is copied from the source's I/O device staging area to the destination's I/O device staging area. The restore process then needs to properly restore the data from the destination's I/O device staging area to the destination device as described above. There is a save function to the source staging area, a copy to the destination staging area, and a restore from the destination staging area by the restore process.

The PCI manager then restores the in-flight transactions by copying them from the storage to the queue where they were originally stored. The only exception is for any in-flight transactions that were originally stored in the source virtual adapter's queue. Any in-flight transactions that were copied from the source virtual adapter's queue are restored to the destination virtual adapter's queue. The PCI manager then restarts the particular virtual adapter, now located on the destination physical adapter, on its destination physical adapter. The PCI manager restarts the particular virtual adapter by sending a command by setting a migration bit to the particular virtual adapter to start executing transactions.

The PCI manager then frees the resources on the source physical adapter that had been allocated to the particular virtual adapter. The physical adapter has a limited set of real, fixed resources. The virtual adapters included within a physical adapter share that physical adapter's resources. When the virtual adapter is freed, resources it was using are given back to the pool of resources for that particular physical adapter. As described above, this sharing can be "hard" which means that the virtual adapter only gets what it is allocated, or "soft" which means that the virtual device is allowed to get the resource it is allocated plus a share of what is unused. In the "hard" case, the physical adapter's resources, such as memory, bandwidth, and time-slices, are given back to the available pool on the physical adapter when a "free resources" process is run for a virtual adapter that had been included on that physical adapter.

A particular virtual adapter may be migrated either in its original configuration state, or it may be modified before it is implemented and included within the destination physical adapter. If there are sufficient physical resources in the destination adapter to support the virtual adapter in its original state, the virtual adapter may be migrated in its original state. In this case, the virtual adapter has the same configuration after it is migrated as it had before it was migrated. Thus, the virtual adapter will be configured the same on the destination physical adapter as it was configured on the source physical adapter.

If there are insufficient physical resources in the destination adapter to support the virtual adapter in its original state, the configuration of the virtual adapter may be modified. The system administrator may also choose to modify the virtual adapter as it is migrated even when there are sufficient resources available in the destination physical adapter.

In the case where the virtual adapter's configuration is modified during migration, the virtual adapter has a different configuration after migration. For example, if the virtual adapter had been granted a particular bandwidth in the source physical adapter but this bandwidth was not available in the destination physical adapter, the configuration of the virtual adapter could be modified such that the virtual adapter, once migrated to the destination physical adapter, would have a smaller bandwidth.

With reference now to the figures and in particular with reference to FIG. 1, a diagram of a distributed computing system 100 is illustrated in accordance with a preferred embodiment of the illustrative embodiment of the present invention. The distributed computer system represented in FIG. 1 takes the form of two or more root complexes (RCs) 108, 118, 128, 138, and 139, attached to an I/O fabric 144 through I/O links 110, 120, 130, 142, and 143, and to the memory controllers 104, 114, 124, and 134 of the root nodes (RNS) 160-163.

A root complex is included within a root node. The host computer system typically has a PCI-to-Host bridging function commonly known as the root complex. The root complex bridges between a CPU bus such as hyper-transport and the PCI bus. Other functions may be performed in the root complex like address translation, if necessary. Multiple hosts containing one or more root complex functions are referred to as a multi-root system. The root complex bridges between a CPU bus such as hyper-transport and the PCI bus. Other functions may be performed in the root complex like address translation, if necessary. Multiple hosts containing one or more root complex functions are referred to as a multi-root system.

A root complex is included within a root node. A root node is a complete computer system, such as a server computer system. A root node is also referred to herein as a host node.

A root node is a complete computer system, such as a server computer system. A root node is also referred to herein as a host node.

The I/O fabric is attached to the IOAs 145-150 through links 151-158. The IOAs may be single function IOAs as in 145-146 and 149, or multiple function IOAs as in 147-148 and 150. Further, the IOAs may be connected to the I/O fabric via single links as in 145-148 or with multiple links for redundancy as in 149-150.

The RCs 108, 118, 128, 138, and 139 are part of an RN 160-163. There may be more than one RC per RN as in RN 163. In addition to the RCs, each RN consists of one or more Central Processing Units (CPUs) 101-102, 111-112, 121-122, 131-132, memory 103, 113, 123, and 133, a memory controller 104, 114, 124, and 134 which connects the CPUs, memory, and I/O RCs and performs such functions as handling the coherency traffic for the memory.

RNS may be connected together 159 at their memory controllers to form one coherency domain and which may act as a single Symmetric Multi-Processing (SMP) system, or may be independent nodes with separate coherency domains as in RNs 162-163.

Figure 4:
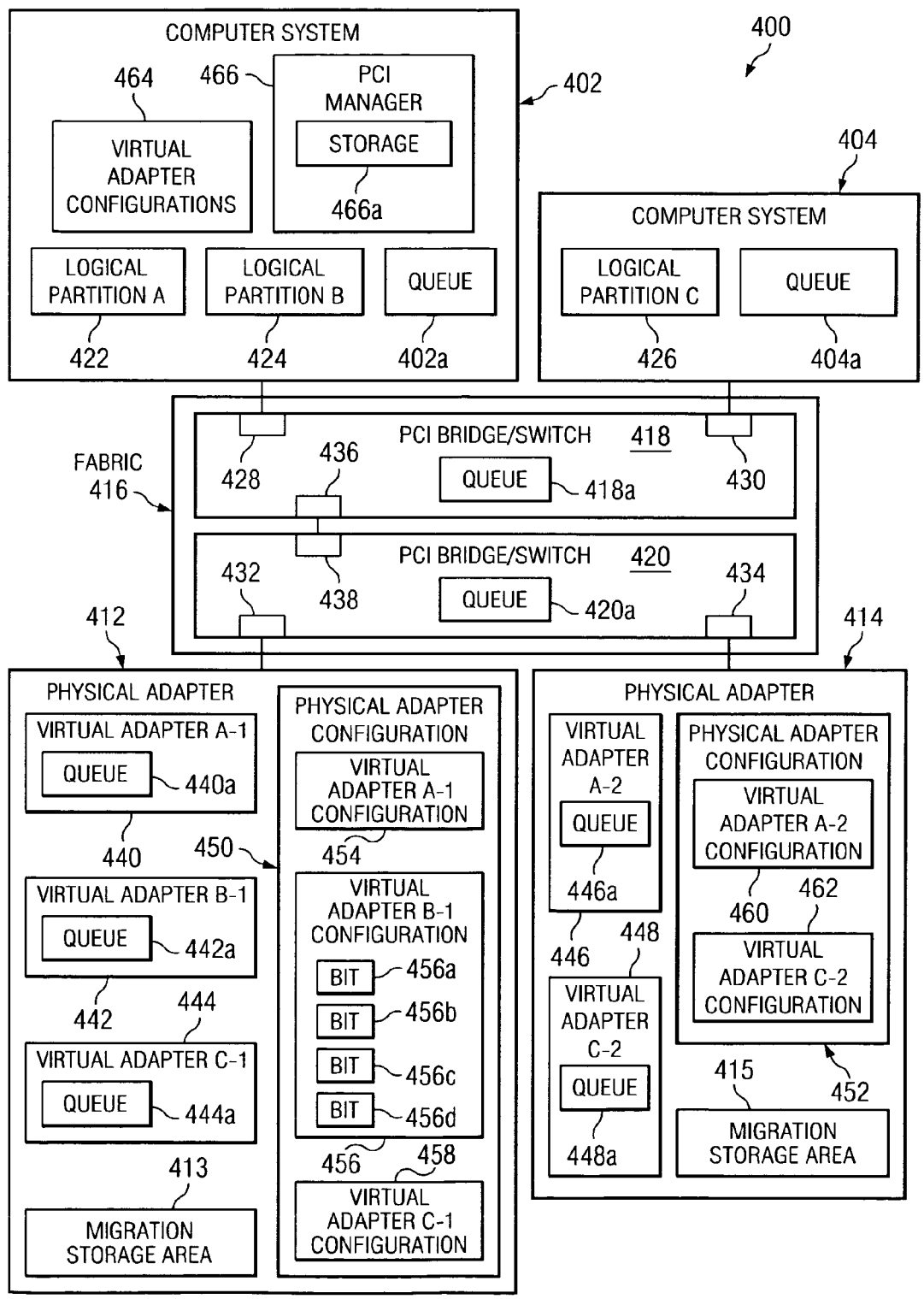
FIG. 4 illustrates a data processing environment that includes the illustrative embodiment, prior to migrating a particular virtual adapter from a source physical adapter to a destination physical adapter, in which computer systems are coupled to adapters, such as I/O adapters, utilizing a fabric of PCI switches in accordance with the illustrative embodiment of the present invention.
Figure 5:
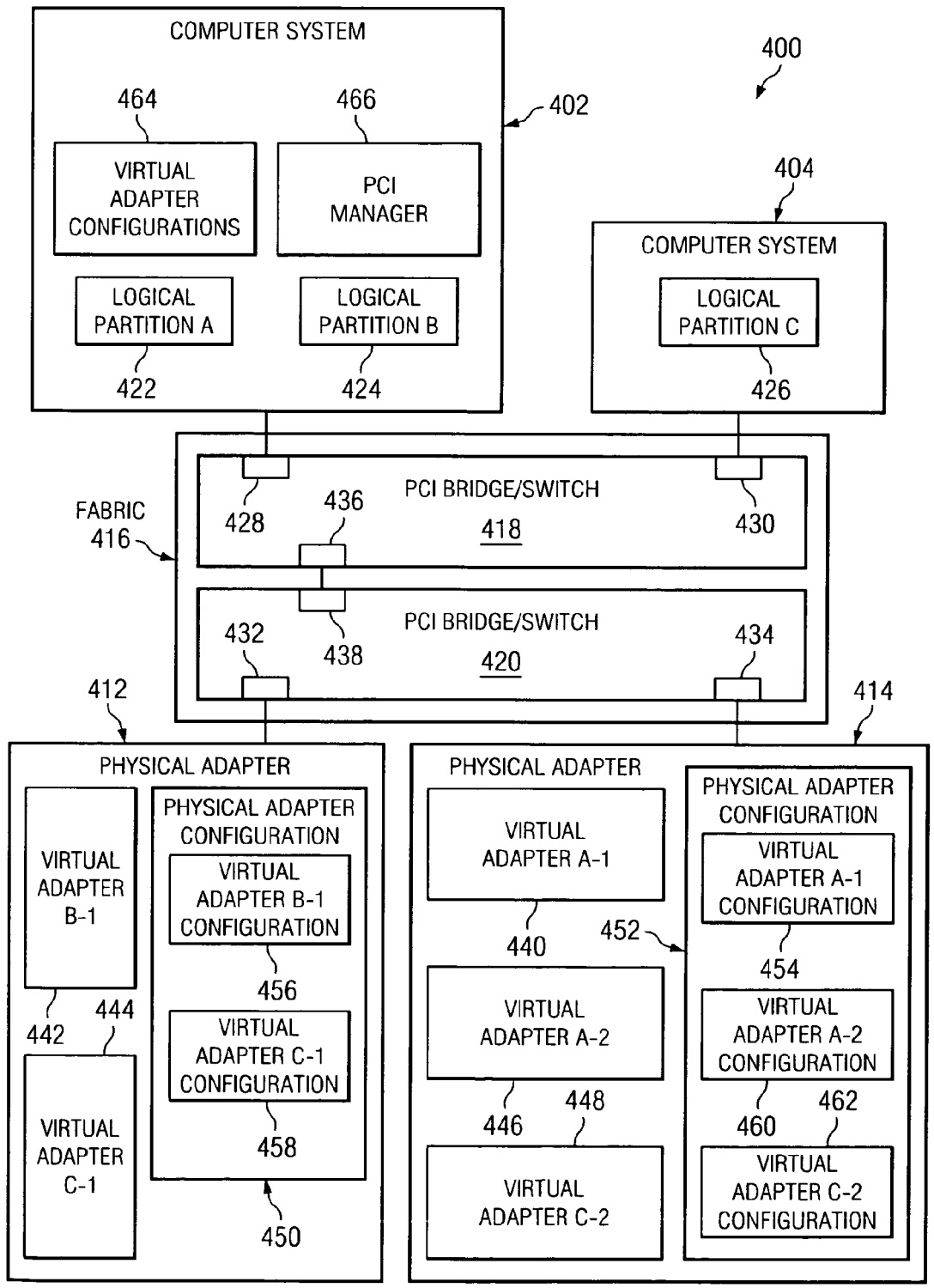
FIG. 5 depicts a data processing environment that includes the illustrative embodiment, after migrating a particular virtual adapter from a source physical adapter to a destination physical adapter where the virtual adapters and physical adapters are not reconfigured after migration, in which computer systems are coupled to adapters, such as I/O adapters, utilizing a fabric of PCI switches in accordance with the illustrative embodiment of the present invention.
Figure 6:
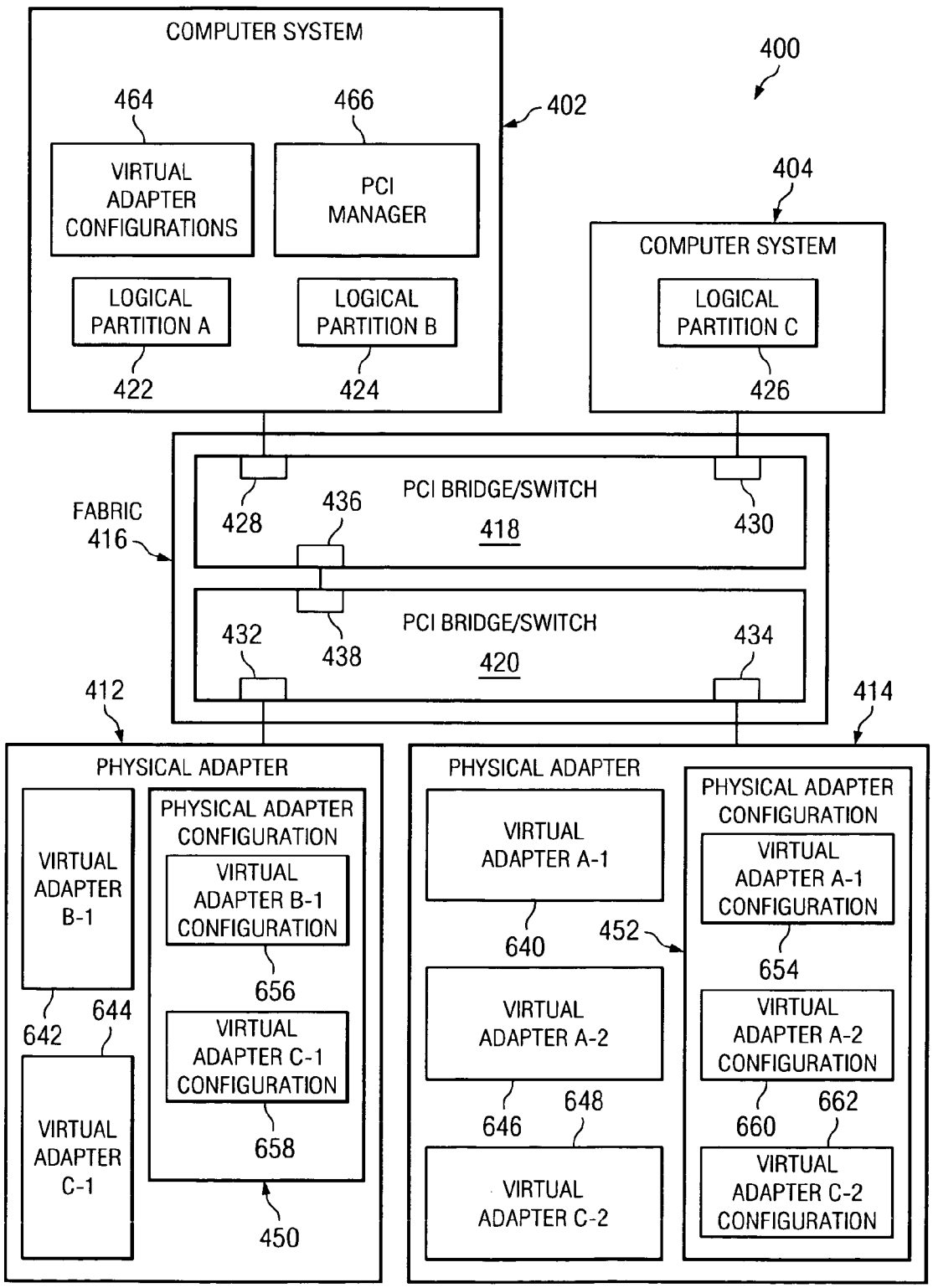
FIG. 6 depicts a data processing environment that includes the illustrative embodiment, after migrating a particular virtual adapter from a source physical adapter to a destination physical adapter where at least some of the virtual adapters and/or physical adapters are reconfigured after migration, in which computer systems are coupled to adapters, such as I/O adapters, utilizing a fabric of PCI switches in accordance with the illustrative embodiment of the present invention.

Configuration manager 164 is also referred to herein as a PCI manager. PCI manager 164 may be attached separately to the I/O fabric 144 or may be part of one of the RNs 160-163. For example, as depicted in FIGS. 4-6, the PCI manager, such as PCI manager 466, may be included in computer system 402. The configuration manager configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiment of the present invention.

Figure 2:
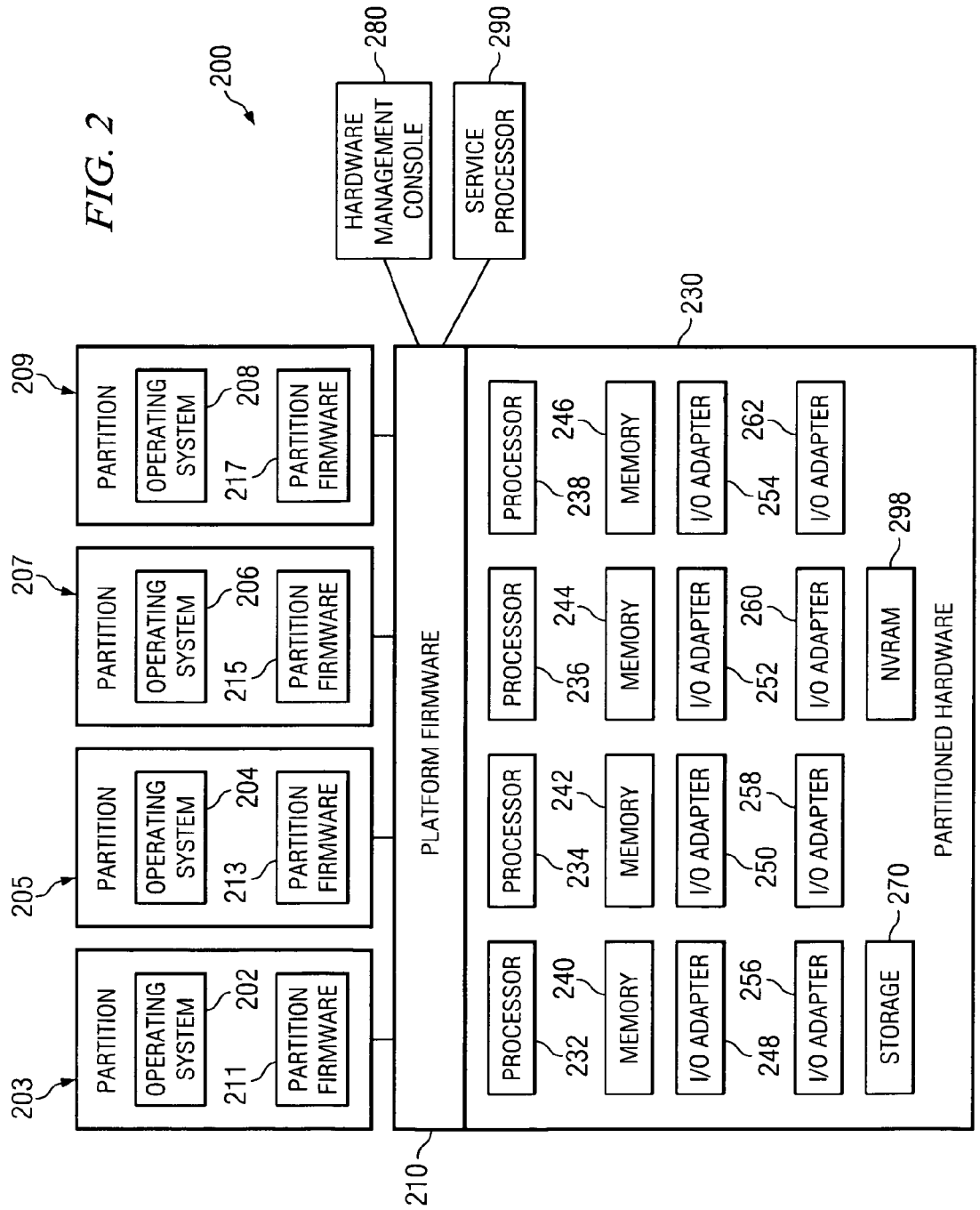
FIG. 2 is a block diagram of a logically partitioned platform that includes the illustrative embodiment of the present invention.

With reference now to FIG. 2, a block diagram of an exemplary logically partitioned platform is depicted in which the illustrative embodiment of the present invention may be implemented. The hardware in logically partitioned platform 200 may be implemented as, for example, distributed computing system 100 in FIG. 1. Logically partitioned platform 200 includes partitioned hardware 230, operating systems 202, 204, 206, 208, and partition management firmware 210.

Operating systems 202, 204, 206, and 208 may be multiple copies of a single operating system or multiple heterogeneous operating systems simultaneously run on logically partitioned platform 200. These operating systems may be implemented using OS/400, which are designed to interface with a partition management firmware, such as Hypervisor. OS/400 is used only as an example in these illustrative embodiments. Other types of operating systems, such as AIX and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, an NVRAM storage 298, and a storage unit 270. Each of the processors 232-238, memory units 240-246, NVRAM storage 298, and IOAs 248-262, or parts thereof, may be partitioned to one of multiple partitions within logical partitioned platform 200 by being assigned to one of the partitions, each of the partitioned resources then corresponding to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate distributed computing system from which a system administrator may perform various functions including reallocation of resources to different partitions.

In a logically partitioned (LPAR) environment, it is not permissible for resources or programs in one partition to affect operations in another partition. Furthermore, to be useful, the assignment of resources needs to be fine-grained.

Figure 3:
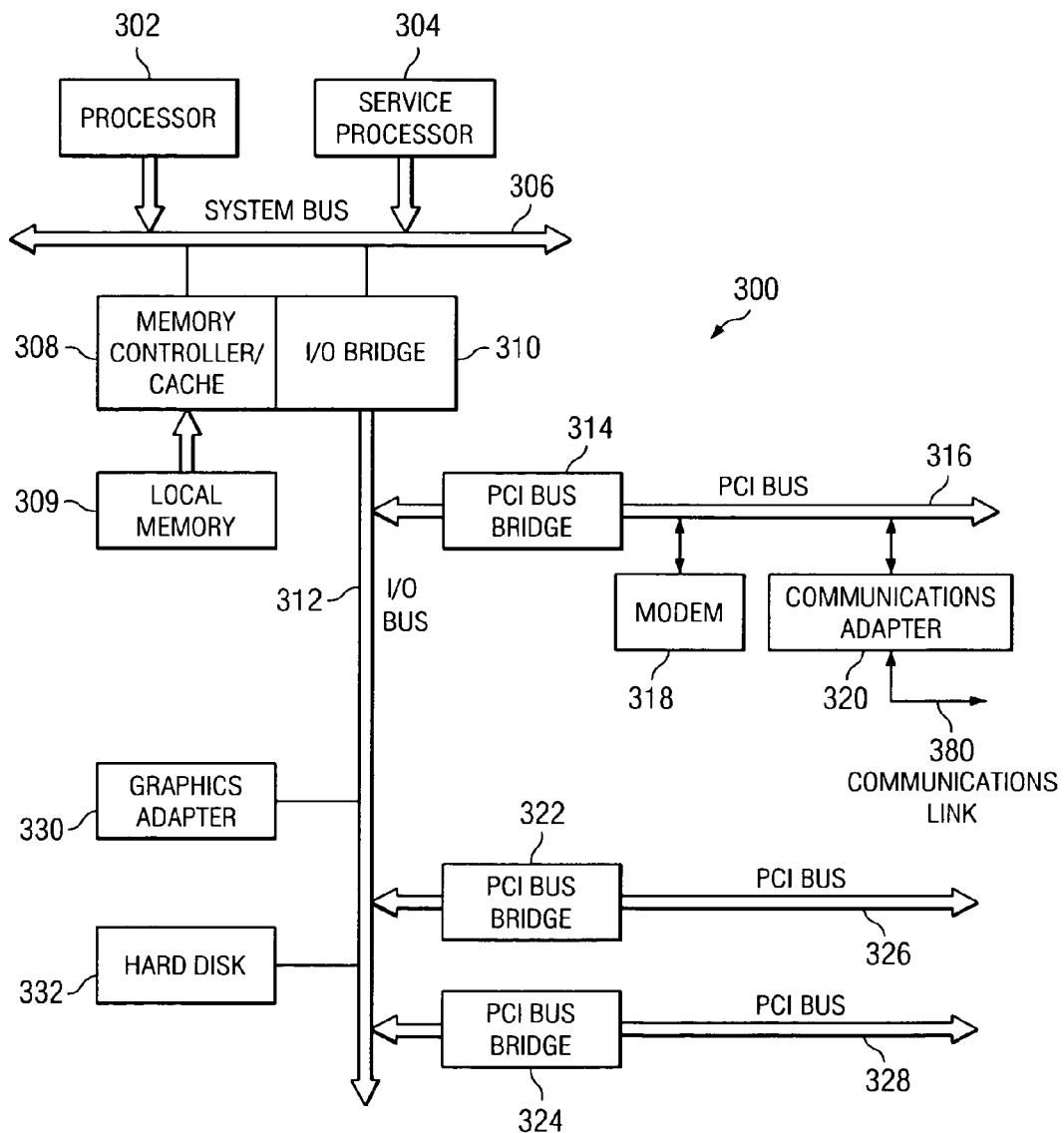
FIG. 3 is a block diagram of a data processing system that is used to implement any of the data processing systems depicted herein in accordance with the illustrative embodiment of the present invention.

FIG. 3 is a block diagram of a data processing system that may be used to implement any of the data processing systems depicted herein in accordance with the illustrative embodiment of the present invention. Data processing system 300 may be a symmetric multiprocessor (SMP) system including a plurality of processors 302 and 304 connected to system bus 306. Alternatively, a single processor system may be employed. In the depicted example, processor 304 is a service processor. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

A conventional peripheral component interconnect (PCI) bus bridge 314 connected to I/O bus 312 provides an interface to a conventional PCI local bus 316. A number of I/O adapters, such as modem 318 may be connected to PCI bus 316. Typical PCI bus implementations will support four PCI expansion slots or add-in connectors. Communications links to other computers may be provided through modem 318 and communications adapter 320. Communications adapter 320 enables data processing system 300 to send and receive messages from another computer system via a communication link 380.

Additional PCI bus bridges 322 and 324 provide interfaces for additional PCI buses 326 and 328, from which additional modems or network adapters may be supported. In this manner, data processing system 300 allows connections to multiple network computers.

A memory-mapped graphics adapter 330 and hard disk 332 may also be connected to I/O bus 312 as depicted, either directly or indirectly.

FIG. 4 illustrates a data processing environment that includes the illustrative embodiment of the present invention in which computer systems are coupled to adapters, such as I/O adapters, utilizing a fabric of PCI switches prior to migrating a particular virtual adapter from a source physical adapter to a destination physical adapter in accordance with the illustrative embodiment of the present invention. Data processing environment 400 includes computer systems 402 and 404. A computer system is also referred to herein as a host node. Thus, computer system 402 may also be referred to herein as host node 402, for example.

Computer systems 402-404 utilize physical adapters 412 and 414. Computer systems 402-404 and physical adapters 412 and 414 communicate with each other via fabric 416. Fabric 416 includes multiple PCI bridge/switches, such as PCI bridges/switches 418 and 420. Fabric 416 is a fabric of devices that conform to the PCI-E standard.

Computer system 402 is coupled to PCI switch 418 via a port 428 that is included within PCI switch 418. Computer system 404 is coupled to PCI switch 418 via a port 430 that is included within PCI switch 418.

Physical adapter 412 is coupled to PCI switch 420 via a port 432 that is included within PCI switch 420. Physical adapter 414 is coupled to PCI switch 420 via a port 434 that is included within PCI switch 420.

PCI switch 418 is coupled to PCI switch 420 by a port 436, included within PCI switch 418, and a port 438, included within PCI switch 420.

PCI switch 418 is a PCI root switch, while PCI switch 420 is not a PCI root switch. A PCI switch is a PCI root switch when that PCI switch is connected directly to one or more host nodes, such as one of computer systems 402 or 404.

Each computer system may be logically partitioned, such as depicted by FIG. 2. For example, computer system 402 includes logical partition A 422 and logical partition B 424. Computer system 404 includes logical partition C 426.

Each physical adapter may be virtualized such that one physical adapter appears to be multiple, separate, and independent adapters. For example, physical adapter 412 appears to be three separate virtual adapters, virtual adapter A-1 440, virtual adapter B-1 442, and virtual adapter C-1 444. Virtual adapter A-1 440 is allocated to logical partition A 422. Virtual adapter B-1 442 is allocated to logical partition B 424. Virtual adapter C-1 444 is allocated to logical partition C 426.

Physical adapter 414 appears to be two separate virtual adapters, virtual adapter A-2 446 and virtual adapter C-2 448. Virtual adapter A-2 446 is allocated to logical partition A 422. Virtual adapter C-2 is allocated to logical partition C 426.

The configuration of a physical adapter is stored within the physical adapter. For example, physical adapter configuration 450 is the configuration of physical adapter 412 so physical adapter configuration 450 is stored within physical adapter 412. A migration storage area, block 413, is provided on physical adapter 412 and is used to containerize the state necessary to migrate a virtual adapter. Physical adapter configuration 452 is the configuration of physical adapter 414 so physical adapter configuration 452 is stored within physical adapter 414. A migration storage area, block 415, is provided on physical adapter 414 and is used to containerize the state necessary to migrate a virtual adapter.

If the physical adapter has been virtualized by representing the physical adapter as one or more virtual adapters, the configuration of the one or more virtual adapters are also stored within the physical adapter. For example, physical adapter configuration 450 includes virtual adapter A-1 configuration 454, virtual adapter B-1 configuration 456, and virtual adapter C-1 configuration 458. Physical adapter configuration 452 includes virtual adapter A-2 configuration 460 and virtual adapter C-2 configuration 462.

Instead of storing the complete configuration, a pointer may be stored in the appropriate physical adapter's configuration that points to the location where the complete configuration is actually stored. For example, virtual adapter A-1 configuration 454 may be stored in storage somewhere in system 400. In this case, a pointer would be stored in physical adapter 450 in place of configuration 454. The pointer would then point to the location where configuration 454 is stored.

A copy of each virtual configuration may also be kept in one of the host nodes. For example, virtual adapter configurations 464 are stored in computer system 402. A copy of virtual adapter A-1 configuration 454, virtual adapter B-1 configuration 456, virtual adapter C-1 configuration 458, virtual adapter A-2 configuration 460, and virtual adapter C-2 configuration 462 are also stored in virtual adapter configurations 464.

Each virtual adapter's configuration includes a migration bit and a resource reallocation bit. For example, configuration 456 includes migration bit 456a, a resource reallocation bit 456b, a migration bit 456c, and a reallocation bit 456d.

When a particular virtual adapter is to be quiesced, i.e. to stop processing, the PCI manager will set the migration bit in the configuration of the particular virtual adapter. When the migration bit is set, it indicates to the virtual adapter to begin a migration process and that the virtual adapter must stop processing. The virtual adapter will see the change in its configuration and interrupt the host with a request to pause the device driver of the physical adapter that includes this virtual adapter. This results in the particular virtual adapter being quiesced. This virtual adapter is then migrated from its source physical adapter to the destination physical adapter.

When a virtual adapter on a destination physical adapter is to be reconfigured, as a result of another virtual adapter being migrated to that destination physical adapter, the virtual adapter on the destination physical adapter must stop processing, i.e. be quiesced. In this case, the PCI manager will set the resource reallocation bit to indicate that the resources for this virtual adapter are going to be reallocated and that the virtual adapter must stop processing. The resources on the destination physical adapter are then reallocated.

A PCI manager may be separate from each computer system, adapter, and the fabric, as depicted in FIG. 1, or may be included within one of the host nodes. For example, PCI manager 466 may be stored in computer system 402. Regardless of where the PCI manager is implemented, the PCI manager will include storage. For example, PCI manager 466 includes storage 466a.

Each device in data processing system 400 includes a queue which holds transactions that the device has received and has yet to process, or transactions that the device intends to transmit to another device but that have not yet been transmitted. For example, computer system 402 includes a transmit/receive queue 402a. Computer system 404 includes a transmit/receive queue 404a. PCI switch 418 includes a transmit/receive queue 418a. PCI switch 420 includes a transmit/receive queue 420a. Virtual adapter 440 includes a transmit/receive queue 440a. Virtual adapter 442 includes a transmit/receive queue 442a. Virtual adapter 444 includes a transmit/receive queue 444a. Virtual adapter 446 includes a transmit/receive queue 446a. Virtual adapter 448 includes a transmit/receive queue 448a. Any transaction that is stored in one of these queues is an "in-flight" transaction.

FIG. 5 depicts a data processing environment that includes the illustrative embodiment of the present invention in which computer systems are coupled to adapters, such as I/O adapters, utilizing a fabric of PCI switches after migrating a particular virtual adapter from a source physical adapter to a destination physical adapter where the virtual adapters and physical adapters are not reconfigured after the migration in accordance with the illustrative embodiment of the present invention. Prior to migrating a virtual adapter, a determination must be made as to whether the virtual adapter is to be altered, or reconfigured, during the migration.

If the virtual adapter is to be migrated without being reconfigured, there must be sufficient resources in the destination physical adapter to be granted to the virtual adapter. For example, a virtual adapter may be migrated such that it uses the same amount of resources on the destination physical adapter that the virtual adapter used on the source physical adapter. For example, the virtual adapter may be granted the same bandwidth on the destination physical adapter that the virtual adapter had been granted on the source physical adapter.

The virtual adapter may be reconfigured after migration. In this case, the virtual adapter is reconfigured to take advantage of the resources that are available on the destination physical adapter.

Virtual adapter A-1 440 has been migrated from physical adapter 412 to physical adapter 414. The configuration of virtual adapter A-1 440 did not change after it was migrated. Because the configuration of virtual adapter A-1 440 did not change, virtual adapter A-1 configuration 454 was just moved from physical adapter configuration 450 to physical adapter configuration 452.

Further, the configurations of virtual adapter B-1 442, virtual adapter C-1 444, virtual adapter A-2 446, and virtual adapter C-2 448 did not change after virtual adapter A-1 440 was migrated.

Because the configuration of virtual adapter B-1 442 and virtual adapter C-1 444 did not change after virtual adapter 440 was migrated, resources will become available on physical adapter 412 and may be allocated to another virtual adapter. These resources that will become available are the resources within physical adapter 412 that had been allocated to virtual adapter A-1 440. The newly freed resources may remain unallocated, may be allocated to another virtual adapter that is to be added to physical adapter 412, or physical adapter 412 may be reconfigured in order to grant some or all of these resources to either virtual adapter B-1 442, to virtual adapter C-1 444, or divided among virtual adapter B-1 442 and virtual adapter C-1 444.

FIG. 6 depicts a data processing environment that includes the illustrative embodiment of the present invention in which computer systems are coupled to adapters, such as I/O adapters, utilizing a fabric of PCI switches after migrating a particular virtual adapter from a source physical adapter to a destination physical adapter where at least some of the virtual adapters and/or physical adapters are reconfigured after migration in accordance with the illustrative embodiment of the present invention.

Virtual adapter A-1 has been migrated from physical adapter 412 to physical adapter 414. The configuration of virtual adapter A-1 changed as it was migrated. In the example depicted in FIG. 6, all of the virtual adapters were reconfigured after virtual adapter A-1 was migrated. After virtual adapter A-1 was migrated, the resources of physical adapter 412 were reconfigured such that virtual adapters B-1 and C-1 each received more resources than they were previously granted prior to virtual adapter A-1 being migrated. Therefore, virtual adapters B-1 and C-1 were reconfigured after the migration of virtual adapter A-1.

After the migration, physical adapter 412 includes virtual adapter B-1 642 and virtual adapter C-1 644. Physical adapter configuration 450 includes virtual adapter B-1 configuration 656 and virtual adapter C-1 configuration 658.

After the migration, physical adapter 414 has been allocated to virtual adapter A-1 640, virtual adapter A-2 646, and virtual adapter C-2 648. Physical adapter configuration 452 now includes virtual adapter A-1 configuration 654, virtual adapter A-2 configuration 660, and virtual adapter C-2 configuration 662.

Figure 7B:
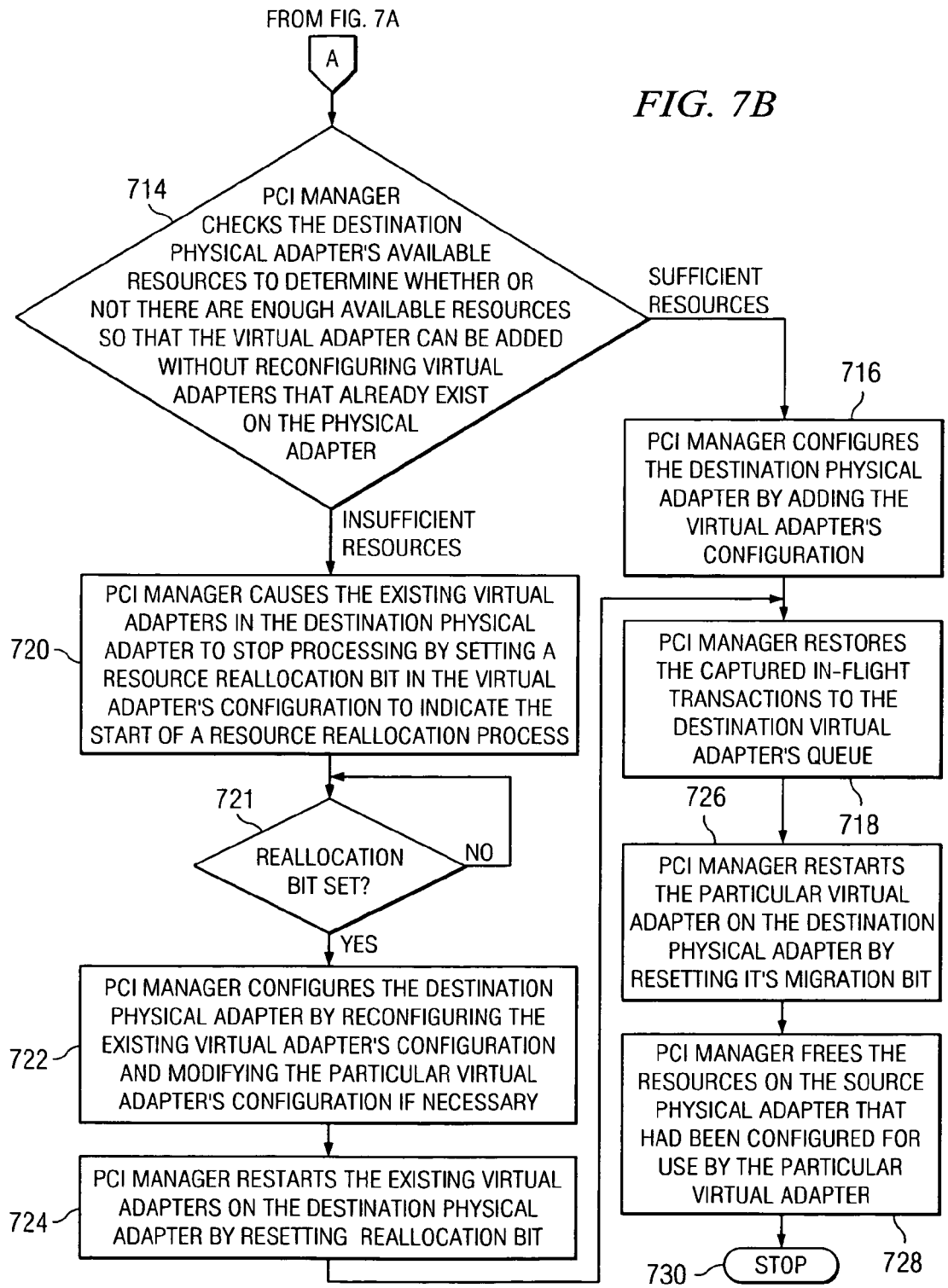

FIGS. 7A and 7B illustrate a high level flow chart that depicts migrating a particular virtual adapter from a source physical adapter to a destination physical adapter in accordance with the illustrative embodiment of the present invention. The process starts as depicted by block 700 and thereafter passes to block 702 which illustrates the system administrator executing a command to migrate a particular virtual adapter from its source physical adapter to a different, destination physical adapter. Next, block 704 depicts the command, which was executed by the system administrator, causing the PCI manager to begin executing.

The process then passes to block 706 which illustrates the PCI manager causing the particular virtual adapter to stop executing transactions. The PCI manager causes the particular virtual adapter to stop executing transactions by setting a migration bit in the virtual adapter's configuration. This causes the virtual adapter to see the change to its configuration. When the virtual adapter sees the change to its configuration, the virtual adapter interrupts the host with a request to pause the device driver for this virtual adapter. This results in the particular virtual adapter being quiesced. The result is that transactions that are queued on the virtual adapter are not serviced. The device driver on the host side is paused so that transactions are also blocked on the host side. The transactions that are contained in the switches' queues are processed and empty out. Although the particular virtual adapter stops processing, all other virtual adapters, physical adapters, host computer systems, and fabric continue processing.

The process then passes to block 707 which illustrates a determination of whether or not a migration bit has been set. The migration bit indicates whether or not the migration has been completed. If a determination is made that the migration bit is not set, the process passes back to block 707. If a determination is made that the migration bit is set, the source virtual adapter is quiesced and the process passes to block 708.

Thereafter, block 708 depicts the PCI manager capturing all in-flight transactions that are either generated by or destined to be transmitted to this particular virtual adapter. These transactions are copied from the queues that are included in the virtual adapters. The transactions are deleted from the queues from which they are copied and are stored in a migration storage area that is in the physical adapter block 413 and 415. Alternatively, the transactions could be stored in a migration staging area in host memory or the PCI Manager if it provides a storage area. Thus, these transactions are moved from their original queues to the storage.

Next, block 710 illustrates the PCI manager obtaining the configuration for this particular virtual adapter. Thereafter, block 712 depicts the PCI manager analyzing the existing configuration of the destination physical adapter.

The PCI manager then checks the destination physical adapter's available resources to determine whether or not there are enough available resources in the destination physical adapter so that the virtual adapter can be added to the destination physical adapter without reconfiguring the virtual adapters that already exist within the destination physical adapter. Block 714, then, illustrates a determination of whether or not there are sufficient resources that are available in the destination physical adapter so that the virtual adapter can be added to the destination physical adapter without reconfiguring the virtual adapters that already exist within the destination physical adapter. If a determination is made that there are sufficient resources, the process passes to block 716 which depicts the PCI manager configuring the destination physical adapter by adding the virtual adapter's configuration to the physical adapter's configuration.

The process then passes to block 718 which illustrates the PCI manager restoring the captured in-flight transactions to the destination virtual adapter's queue. Any transactions that were copied from the migrated virtual adapter's queue when that virtual adapter existed within the source physical adapter will be copied to that virtual adapter as it now exists within the destination physical adapter. The process then passes to block 726.

Referring again to block 714, if a determination is made that there are insufficient resources, the process passes to block 720 which depicts the PCI manager causing the existing virtual adapters in the destination physical adapter to stop processing by setting a resource reallocation bit in the virtual adapter's configuration. This causes the virtual adapter to see the change to its configuration. When the virtual adapter sees the change to its configuration, the virtual adapter interrupts the host with a request to pause the device driver for the physical adapter which includes this virtual adapter. This results in the physical adapter, and its virtual adapters including the particular virtual adapter, being quiesced. The result is that transactions that are queued on the virtual adapter are not serviced. The device driver on the host side is paused so that transactions are also blocked on the host side. The transactions that are contained in the switches' queues are processed and empty out.

The process then passes to block 721 which illustrates a determination of whether or not a reallocation bit has been set. The reallocation bit indicates whether or not the reallocation has been completed. If a determination is made that the reallocation bit is not set, the process passes back to block 721. If a determination is made that the reallocation bit is set, the virtual adapters on the destination physical adapter have been quiesced and the process passes to block 722.

Next, block 722 illustrates the PCI manager configuring the destination physical adapter by reconfiguring the existing virtual adapter's configuration and modifying the particular virtual adapter's configuration, if necessary. Thereafter, block 724 illustrates the PCI manager restarting the existing virtual adapters on the destination physical adapter. This process is restarted by resetting the resource reallocation bit. The adapter would then signal its device driver which would then do what is necessary to restart all of the virtual adapters on its physical adapter. The process then passes to block 718 which illustrates the PCI manager restoring the captured in-flight transactions to the destination virtual adapter's queue.

Block 726, then, depicts the PCI manager restarting the particular virtual adapter on the destination physical adapter. This process is restarted by resetting the migration bit. The adapter would then signal its device driver which would then do what is necessary to restart all of the virtual adapters on its physical adapter. Next, block 728 illustrates the PCI manager freeing the resources on the source physical adapter that had been configured for use by the particular virtual adapter. The process then terminates as depicted by block 730.

A virtual adapter group is a set of virtual adapters on a particular physical adapter. Those skilled in the art will recognize that the process described by FIGS. 7A and 7B can be performed multiple times in order to migrate a group of virtual adapters from a particular source physical adapter to a particular destination physical adapter. In this manner, a virtual adapter group could be migrated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, in a data processing environment, that includes a plurality of host computer systems that are coupled to a plurality of adapters using a fabric for migrating a virtual adapter from a source physical adapter to a destination physical adapter, said apparatus comprising:
    said apparatus including a configuration manager;
    said configuration manager causing said virtual adapter to stop processing transactions;
    said configuration manager capturing all in-flight transactions that are associated with said virtual adapter;
    said configuration manager migrating said virtual adapter to said destination physical adapter by moving configuration information for said virtual adapter from said source physical adapter to said destination physical adapter;
    said configuration manager restoring said in-flight transactions; and
    said configuration manager restarting said virtual adapter on said destination physical adapter, wherein said virtual adapter is included in said destination physical adapter and wherein said virtual adapter begins processing transactions.

2. The apparatus according to claim 1, further comprising:
    said configuration manager identifying resources on said source physical adapter that had been allocated to said virtual adapter; and
    said configuration manager freeing said identified resources after said virtual adapter is moved to said destination physical adapter.

3. The apparatus according to claim 1, further comprising:
    said configuration manager determining an amount of physical adapter resources needed by said virtual adapter;
    said configuration manager determining whether said amount of resources are available on said destination physical adapter; and
    in response to determining that said amount of resources are available on said destination physical adapter, said configuration manager allocating resources of said destination physical adapter in said amount of resources to said virtual adapter in response migrating said virtual adapter to said destination physical adapter.

4. The apparatus according to claim 3, further comprising:
    said configuration information defining a configuration of said virtual adapter;
    in response to determining that said amount of resources are available on said destination physical adapter, said configuration manager reconfiguring said virtual adapter by modifying said configuration information; and
    said configuration manager migrating said virtual adapter by storing said modified configuration information in said destination physical adapter.

5. The apparatus according to claim 1, further comprising:
    said configuration information including a pointer to a configuration that defines said virtual adapter.

6. The apparatus according to claim 5, further comprising:
    said configuration being stored in said configuration manager that manages said fabric.

7. The apparatus according to claim 5, further comprising:
    before migrating said virtual adapter, said configuration being stored in said configuration manager that manages said fabric and in said source physical adapter; and
    after migrating said virtual adapter, said configuration being stored in said configuration manager and in said destination physical adapter.

8. The apparatus according to claim 1, further comprising:
    said fabric including a plurality of devices;
    each one of said plurality of host computer systems, said plurality of adapters, and said plurality of devices including a queue for storing in-flight transactions;
    said configuration manager capturing all said in-flight transactions by moving all in-flight transactions from each one of said queues from each one of said plurality of host computer systems, said plurality of adapters, and said plurality of devices that are either destined to be transmitted to said virtual adapter or that had been transmitted from said virtual adapter.

9. The apparatus according to claim 1, further comprising:
    said fabric being a PCI Express switched fabric that includes a plurality of PCI Express devices.

10. A computer program product for migrating a virtual adapter from a source physical adapter to a destination physical adapter in a data processing environment that includes a plurality of host computer systems that are coupled to a plurality of adapters using a fabric said program product comprising:
    a computer usable medium including computer usable program code, stored thereon, said computer usable program code including;
    computer usable program code for causing said virtual adapter to stop processing transactions;
    computer usable program code for capturing all in-flight transactions that are associated with said virtual adapter;
    computer usable program code for migrating said virtual adapter to said destination physical adapter by moving configuration information for said virtual adapter from said source physical adapter to said destination physical adapter;
    computer usable program code for restoring said in-flight transactions; and
    computer usable program code for restarting said virtual adapter on said destination physical adapter, wherein said virtual adapter is included in said destination physical adapter and wherein said virtual adapter begins processing transactions.

11. The computer program product according to claim 10, further comprising:
   computer usable program code for determining an amount of physical adapter resources needed by said virtual adapter;
   computer usable program code for determining whether said amount of resources are available on said destination physical adapter; and
   in response to determining that said amount of resources are available on said destination physical adapter, computer usable program code for allocating resources of said destination physical adapter in said amount of resources to said virtual adapter in response migrating said virtual adapter to said destination physical adapter.

* * * * *